PICTURE ANALYSIS AND RECORDING DEVICES

Filed Oct. 8, 1951

INVENTOR
Paul Mandel
By Ralph B. Stewart
attorney

United States Patent Office 2,775,644

Patented Dec. 25, 1956

2,775,644

PICTURE ANALYSIS AND RECORDING DEVICES

Paul Mandel, Paris, France, assignor to Societe Nouvelle de l'Outillage R. B. V. et de la Radio-Industrie (R. B. V.-R. I.), Paris, France, a joint-stock company Application October 8, 1951, Serial No. 250,236

Claims priority, application France October 14, 1950

9 Claims. (Cl. 178—7.2)

The present invention relates to improvements in devices for the analysis and recording of pictures, from or on a moving kinematographic film, of the kind in which the fluorescent screen of a cathode ray tube is used as a source of light for scanning the pictures to be analyzed.

Considering for instance an analyzing device of this kind, often called a "flying-spot" scanner, it is known that such device incorporates first a cathode-ray tube, the electron beam of which is deflected, in both the horizontal and the vertical directions, according to the usual television raster (generally constituted by two interlaced elementary rasters) so that a light spot travels along said raster on the fluorescent screen of the cathode ray tube. An optical channel, comprising two distinct paths, as defined for instance by means of a pair of joined prisms and a common dioptric lens system, form a double image of said light spot in the upper and lower portions respectively of a window behind which is driven an exposed kinematographic film bearing the views of the pictures to be analyzed. The light beams passing through said film strike on the cathode of a photo-cell the output of which is connected to a pick-up channel for the electric video signal thus generated. However, a shutter alternately unmasks or exposes first one and then the other of the upper and lower portions of said window, so that the light image of the scanning spot appears alternatively in the upper and the lower portions of the window, in accordance with the rate of a complete scan of an elementary raster of the cathode ray tube. Thus the frame signal of an elementary raster from the pictures is completely generated during the driving of a complete view of the film through the upper portion of the window, and the elementary frame signal of the complementary raster is similarly completely generated during the passing of said same view through the lower portion of the window. The frequency of the scanning of the cathode ray tube and the rate of motion of the shutter, as well as the driving speed of the kinematographic film, are so adjusted as to produce the above-mentioned result.

Conversely, a device for recording on an unexposed kinematographic film pictures represented by the amplitude modulation of a television video signal comprises a cathode ray kinescope the electron beam of which is modulated by the video signal and is deflected according to the usual television raster as above-defined, so as to display on its screen each of the complete views to be recorded in two successive frames. A two-channel optical system, as described above, projects the light images from the screen of the cathode ray tube, view after view, on a moving unexposed kinematographic film through the action of a shutter controlled in the same way as the one for the analyzer device. Such an optico-mechanical arrangement is identical with that of the analyzing device, with the mere omission of the photo-cell behind the film.

In such devices, aside from any optical or electrical modulation, it is well known that the light intensity in the window varies periodically and with oppositely related variation from one elementary raster of the scanning to the other. This flicker effect gives a cyclical variation of mean brightness in the recorded pictures, which is translated into a cyclical variation of the mean amplitude in the video signal.

Further, this flicker effect is well known per se, and for reducing it, it has been proposed to place an adjustable diaphragm in the optical lens system. This manner of reducing flicker is undesirable for it produces a loss of light energy, and it is the lack of light energy which is generally the limiting factor on the use of such devices.

The present invention has more particularly for its object to provide means for suppressing the flicker effect in analyzing and recording devices of the kind specified above, without the use of an optical diaphragm.

Briefly stated, the invention provides the introduction of an additional modulation component of electric signal generated with a cyclical amplitude change so as to compensate for the corresponding cyclical variation of the mean amplitude in the video signal resulting from the flickering of brightness. In a recording device, such a compensation will ensure the correction of the mean brightness of the reproduced picture, once the electrical to optical conversion be made.

Means for cyclically generating and introducing in the equipments or devices such an additional modulation component of electric signal will be fully described in relation to the accompanying drawings, in which.

Figure 1:
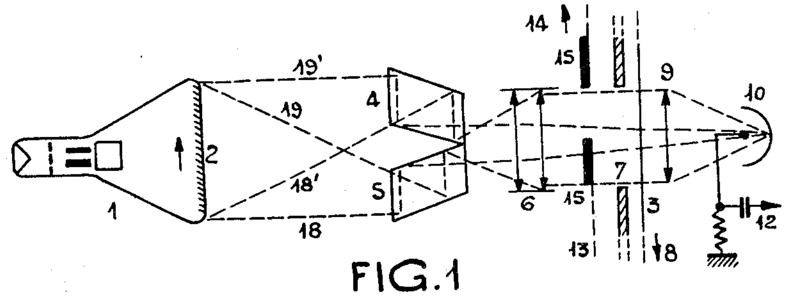
Fig. 1 shows a typical arrangement, though diagrammatically represented, of a picture analyzing device of the kind concerned.

Referring now to Fig. 1, the cathode ray tube of the "flying-spot" scanner is shown at 1 and its fluorescent screen at 2. The light spot thus formed is the light source for the scanning of the kinematographic film 3, when the electron beam of the tube 1 is deflected in accordance with the usual television raster.

The light spot from the screen 2 is picked up by an optical projecting system which comprises two prisms 4 and 5, dividing the light flux from the screen in two separate optical paths. These paths passing through the upper and lower portions of the objective 6 constitute two beams covering, together, the total height of a picture view or frame on the kinematographic film 3 (one view proper plus an interval between two consecutive views). The kinematographic film 3 is driven, in the direction of the arrows 8, behind the window 7. For convenience, it will be assumed that the height of the window 7 is equal to the height of a view on the film. A field lens 9 focuses the optical image of the film on the cathode of a photo-cell 10 the output of which, for instance the anode output, is connected to the load impedance 11 to the upper tap of which is connected the electric signal pick-up channel 12 for the signal which is generated through the light variations, dot by dot, of the optical beam modulated in brightness by its passing through film 3.

Between the objective 6 and the window 7 (it can as well be between the window 7 and the film 3) a shutter 13 is driven at the same speed as the image of the light spot from screen 2, and in the same direction. This shutter 13, driven in the direction of the arrow 14, presents opaque portions 15 of a height equal to half the height of the window 7, with opened intervals of that same height. Thus, by a process well known in itself, by adjusting the driving speed of the kinematographic film 3 so that half the height of the window is covered in the time interval in which the spot image completes an elementary raster on the screen 2, the generation of a complete video signal is provided for each view of the film, by two consecutive steps, one corresponding to the passing of said view through the height of the upper part of the window, the other corresponding to the passing of said same view through the height of the lower part of the window 7. During the time interval of the first elementary raster, it is the optical flux from prism 4 which is brought in action, the optical flux transmitted through prism 5 being blocked by an opaque portion of the shutter, and conversely, during the time interval of the complementary elementary raster, the flux through prism 5 is effective and that through prism 4 is blocked. The light image of the spot for the scanning of the first frame moves upwardly with the upward movement of the opaque portion 15 of the shutter which is positioned in front of the lower half of the window at the instant of starting the scanning of said frame, and the light image of the spot for the second frame similarly moves upwardly with the upward movement of the following opaque portion of the shutter, that is the opaque portion which, at the instant of starting of said second time interval, is positioned at the lower edge of the lower half of said window.

Figure 2:
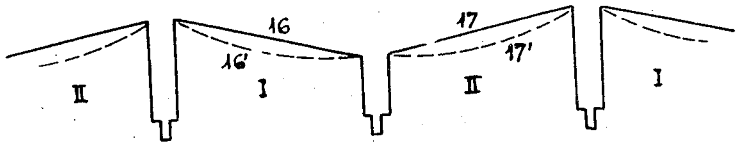
Fig. 2 shows the qualitative change of the output signal of the photo-cell of said analyzer, when no impressed kinematographic film is present in the arrangement of Fig. 1.

When the film is omitted from the equipment, all things otherwise being unchanged, the output signal from the photo-cell 10 normally has the amplitude configuration shown in Fig. 2. The voltage which corresponds to the scanning of the first elementary raster, I, is, as a whole, of decreasing amplitude and the voltage which corresponds to the second or complementary raster, II, is, as a whole, of increasing amplitude. As shown at 16 and 17, respectively, rectilinear shapes are indicated for these voltages but, in actual practice, these shapes vary for each optical system and, for instance, these shapes are modified as shown at 16′ and 17′, i. e., the general presentation becomes incurved or concave.

This imperfection indicates a lack of uniformity of the optical flux at the output of the objective 6. It is plain that if, Fig. 1, the light beam 18 starts from the bottom of the fluorescent screen 2 and directly passes through prism 5 and objective 6, the upmost position of the beam, at 19, from the top of the screen is partially subjected to a diaphragmation effect in passing through objective 6; conversely, the same effect occurs for the beams 18′ and 19′ which pass through prism 4.

For suppression of such a defect, the present invention provides for a compensating action by means of an additional modulating component of an electric signal.

Figure 3:
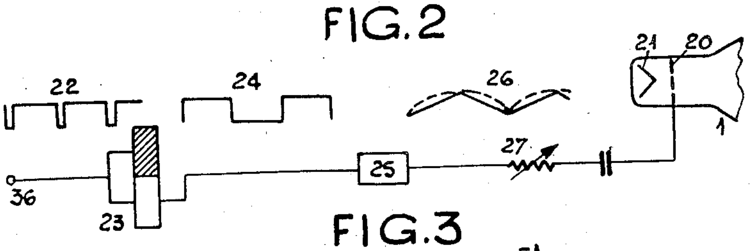
Fig. 3 shows the diagram of a circuit for correcting said flicker effect, in accordance with the present invention.

Firstly, as shown in Fig. 3, a brightness control electrode of the cathode ray tube 1 is controlled by said compensating signal component. In Fig. 3, this electrode is, for instance, the Wehnelt electrode or grid 20 of the tube, though it can consist as well of the cathode.

The compensating signal is, in all cases, generated as follows:

The cyclical series of the synchronization pulses 22 of the frame elementary rasters is applied on a conventional trigger stage 23, having a double stability condition. This stage 23, of the lock-over or flip-flop type, is such that, each time a pulse 22 is applied on its input 36, it rocks or shifts its condition through the well-known triggering process. On one of the plates of said two-valve stage, an alternating voltage of rectangular wave form appears, as indicated at 24. This voltage is applied to a shaping circuit 25 and the resulting or reshaped voltage produced by this circuit has, for instance, the symmetrical saw-tooth voltage shaping indicated at 26. This voltage 26 is adjusted in amplitude in a potentiometer 27, or attenuator, and then applied on the control electrode 20 of the cathode ray tube 1.

For practical use, it is necessary to provide means for choosing and adjusting, for each optical system, as mentioned above, a compensating voltage of a particular shape, and of cyclical inversion at the frequency of the frame synchronization pulses, 22. A shaping circuit for this use is illustratively shown in Fig. 4. In this figure, a conventional design of trigger stage 23 is shown: it comprises two electron tubes 28—29 (in a single envelope) having cross-connections between control electrodes and plates, as indicated by the time constant networks 30 and 31. The control electrodes are biased through resistors 32 and 33; the cathodes are biased through resistor 34. The stage is controlled, for instance, from a common point of application, 35, of input frame synchronizing pulses introduced on terminal 36. A direct connection to one or the other of the grids can also be used as well for the triggering.

One of the plates of the trigger stage 23, through conductor 37, is connected to one end of a potentiometer 38 constituting a load impedance grounded at its other terminal point. The tap of this potentiometer is connected to the control grid of a high internal resistance tube 40, a pentode type for instance, having a potentiometer 41 in its output plate load, the tap of said last potentiometer 41 being, for instance, connected to the intensity control electrode 20 of the cathode ray tube 1. Through this path a rectangular voltage may be applied on the grid of tube 1 with a level of amplitude which can be adjusted by either or both of the potentiometers 38 and 41.

The conductor 37 from the trigger stage 23 is also connected to the control grid of an electron tube 43 (a triode for instance), the grid being biased through a resistor 44. The output circuit of this tube, including the plate resistor 45 and the grounded capacitor 46, constitutes an integrating circuit for the rectangular signal from the trigger stage 23. Tube 43 thus delivers to a load potentiometer 47 a symmetrical saw-toothed voltage. The tap 48 of potentiometer 47 is connected to the control grid of a pentode tube 49, of similar characteristics as those of tube 40, and the plate output of valve 49 is also connected to the load potentiometer 41. Thus, a symmetrical saw-tooth wave form signal can be added to the first rectangular signal, for application of the composite signal on the control grid of tube 1, and the relative amplitudes of the rectangular and saw-toothed voltages may be adjusted at will by the actuation of potentiometers 38 and 47.

Finally, through branch circuit 50, the saw-toothed signal from stage 43 is applied on the control electrode of a triode tube 51 the plate circuit of which is also arranged to operate as an integrator of voltage, by means of the grounded capacitor 53 and the plate resistor 54. On the load potentiometer 55 of this last tube, a tap 56 supplies an undulating voltage to the input control electrode of a high impedance valve 57. This valve 57 is of similar characteristics as valves 40 and 49, and its plate is also connected to the final load potentiometer 41. Hence, this undulating voltage may be introduced in the voltage applied for compensation purposes on the control grid of tube 1.

Tubes 40, 49 and 57, having a common output, constitute in fact a mixer circuit which, once the potentiometers 38, 47 and 55 are adjusted, supplies a definite compensating voltage on the cathode ray tube 1. The individual output of each tube is transmitted to potentiometer 41 independently of the value of the output of one or both of the remaining tubes.

Such a composite compensating voltage, generated and adjusted as above-described, can also be applied, not on the control electrode or the cathode of the cathode ray tube 1, but can as well be applied on a circuit which amplifies the output signal from the photo-cell in an analyzing device, or which amplifies the input signal for application on the kinescope in a recording device. It is quite clear, in fact, that the stray variation of brightness, or flicker effect, which appears on the screen of the cathode-ray tube results, if no other steps are taken, in a stray variation of the output voltage from the photo-cell, and the compensation may be applied, then, as well in the output of said photo-cell, i. e. in an amplifier circuit which is controlled by the voltage from conductor 12. It is also quite clear that the compensating voltage will provide, when applied in an amplifier of the video signal for the brightness control of a reproducing cathode ray tube, a similar compensating action as if applied directly on a modulation control electrode of this tube. The manner of introduction of the compensating voltage is quite plain, either by mixing it with the incoming signal or by mixing it with a partially amplified incoming signal, if the amplifier concerned is a multi-stage one.

Naturally, the introduction of an additional modulation component in an amplifier circuit will, in conventional amplifiers, bring an unbalance from said additional gain control action, if this compensating voltage is introduced, alternately, as a gain control voltage supplied to at least one tube of the amplifier for the control of the variable gain of said tube. Conventional techniques are known for compensation of such unbalance as is introduced by a change of the gain factor of an amplifier circuit and can be applied in such a case as is concerned here.

In another way, especially when the output connection 12 from a photo-cell, or if this photo-cell itself, comprises an electron multiplier of the cascade type, the compensating voltage can be applied on one of the secondary emissive electrodes of the electron multiplier.

The above described manner of introduction of the flicker compensating voltage into an amplifier circuit seems to be particularly advantageous when the cathode ray tube is of a high intensity of electron beam kind, for instance when the intensity of its electron beam is of about 50 micro-amperes and more. In such a case, a direct control could, in certain conditions, react on the focussing of the beam which would have to be readjusted. It appears simpler, in such cases, to avoid any chance of defocussing by introducing the compensating voltage, not on a control electrode of the cathode ray tube, but in an amplifier circuit which amplifies the signal to or from said tube.

Figure 4:
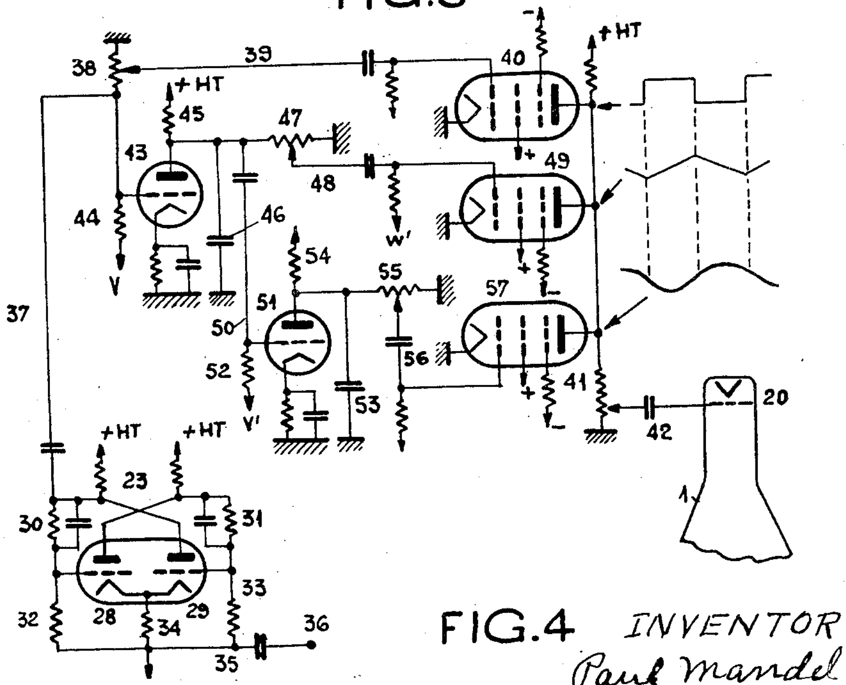
Fig. 4 shows a detailed vacuum tube circuit for use as the circuit component 25 in the diagram of Fig. 3.

In any case, the adjustment of the shaping of the correcting electric wave-form is made by omitting the picture signal (i. e. by omitting the impressed kinematographic film in an analyzing device and the video signal in a recording device); then by measuring the output current from a photo-cell amplifier (the own photo-cell of an analyzing device, or a control photo-cell at the same place, added for the shaping operation in a recording device) and progressively reducing to zero the change of amplitude of the measured current by adjusting the potentiometers indicated in Fig. 4.

In the appended claims, the term "picture translating system" is intended to apply broadly to a picture analyzing arrangement, a picture recording arrangement, or a system including both arrangements.

I claim:

1. In a picture translating system in which the beam of a cathode ray scanning tube is driven according to a television interlaced raster under the control of frame synchronizing pulses, and an optical image of the screen of said tube is formed on a kinematographic film through two cooperative optical paths alternately unmasked at the frame frequency of said interlaced raster, an anti-flicker arrangement comprising a bi-stable flip-flop triggering stage actuated by the frame synchronizing pulses of said raster and producing an output wave of rectangular wave-form of one-half the frequency of said synchronizing pulses, a wave-form shaping circuit connected to one output of said stage, means in said shaping circuit for directing the incoming rectangular wave-form to a first output tube through amplitude controlling means, means for directing said incoming wave-form to a voltage integrating stage, means at the output of said integrating stage for directing the symmetrical saw-tooth wave-form thus derived to a second output tube through amplitude controlling means, means for directing said symmetrical saw-tooth wave-form to the input of a further integrating stage, means at the output of said last integrating stage for directing the undulating wave-form thus derived to a third output tube through amplitude controlling means, said three output tubes having a common load impedance comprising an adjustable potentiometer, and a connection from the tap of said potentiometer to supply a flicker correcting voltage to the control grid of an electron tube included in the transmission channel of said picture translating system.

2. An anti-flicker arrangement according to claim 1, wherein the output of said common load potentiometer is directly connected to the intensity control electrode of the cathode ray tube.

3. An anti-flicker arrangement according to claim 1, wherein the output of said common load potentiometer is connected to an input of a mixing amplifier in the picture-signal channel.

4. An anti-flicker arrangement according to claim 1, wherein the output of said common load potentiometer is connected to a gain control electrode of an amplifier tube for the picture-signal of the system.

5. In a flying-spot picture-translating system wherein the beam of a cathode ray tube is driven according to a television interlaced raster under the control of frame synchronizing pulses, and an image of the flying spot of said tube is caused to scan a kinematographic film through two cooperative optical paths alternately unmasked at the frame frequency of the interlaced raster with resultant production of a cyclically varying flicker modulation component independent of any signal modulation component in the picture-bearing wave, means for deriving from the frame synchronizing pulses of said raster an alternating voltage of rectangular wave-form of one-half the frequency of said frame synchronizing pulses, means for deriving from said rectangular wave-form voltage a symmetrical saw-tooth voltage of the same frequency, means for adjusting the amplitude of said symmetrical saw-tooth wave-form voltage and anti-flicker means for introducing said adjusted electrical saw-tooth wave-form voltage into the system as an additional modulation component opposing the said flicker modulation component for flicker-reducing purposes.

6. Combination according to claim 5, wherein means are further provided for also deriving from the said symmetrical saw-tooth voltage an additional undulated wave-form voltage, for adjusting the amplitude of said additional undulated wave-form voltage and for adding said adjusted additional undulated wave-form voltage to said adjusted electrical saw-tooth wave-form voltage prior to its introduction into the system for the said flicker-reducing purposes.

7. Combination according to claim 5, wherein said anti-flicker means comprises means controlling the beam luminosity of said cathode ray tube in accordance with the opposing modulation components.

8. Combination according to claim 5, in which said system includes a mixing amplifier in the picture-signal channel having an input, and wherein said anti-flicker means includes means for applying said opposing modulation components to the input of said mixing amplifier in the picture-signal channel.

9. Combination according to claim 5, in which said system includes an amplifier tube for the picture-signal channel having means for applying gain control voltage to said amplifier tube, and wherein said anti-flicker means includes means for applying said opposing modulation component voltages as gain control voltage for said amplifier tube.

(References on following page)

References Cited in the file of this patent

UNITED STATES PATENTS

| | | |
|---|---|---|
| 2,166,712 | Bedford | July 18, 1939 |
| 2,226,706 | Cawein | Dec. 31, 1940 |
| 2,271,876 | Seeley | Feb. 3, 1942 |
| 2,338,646 | Kessler | Jan. 4, 1944 |
| 2,375,968 | Felgel-Farnholz | May 15, 1945 |
| 2,445,040 | Schade | July 13, 1948 |